United States Patent Office 3,840,517
Patented Oct. 8, 1974

3,840,517
PHENYLAZO-N-HETEROTHIOALKYLANILINE
COMPOUNDS
Max A. Weaver and Clarence A. Coates, Jr., Kingsport, Tenn., assignors to Eastman Kodak Company, Rochester, N.Y.
No Drawing. Continuation of abandoned application Ser. No. 784,215, Dec. 16, 1968. This application Nov. 10, 1971, Ser. No. 197,518
Int. Cl. C09b 29/26, 29/36; D06p 3/52
U.S. Cl. 260—157
8 Claims

ABSTRACT OF THE DISCLOSURE

Azo compounds which exhibit excellent dyeability and fastness to light and sublimation on polyester fibers have a phenyl or phenylazophenyl diazo component and an m-acylamidoaniline coupling component in which the aniline nitrogen atom is substituted with an aryl-, aralkyl-, cycloalkyl-, pyridyl-, quinolyl-, pyrimidinyl- or azolyl-thioalkyl group.

---

This application is a continuation of our application Ser. No. 784,215, filed Dec. 16, 1968 and now abandoned, for "Azo Compounds and Polyester Textile Materials Dyed Therewith."

This invention relates to certain novel, water-insoluble, azo compounds and to polyester textile materials dyed therewith.

The novel azo compounds of the invention have the general formula (I) 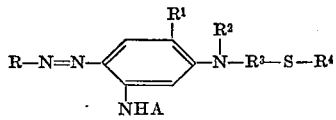

wherein
R is a phenyl radical;
A is an acyl radical;
$R^1$ is hydrogen, lower alkyl, lower alkoxy or halogen;
$R^2$ is hydrogen, a lower alkyl radical, a cyclohexyl radical, a phenyl radical, an aralkyl radical, or the group $—R^3—S—R^4$;
$R^3$ is a lower alkylene radical; and
$R^4$ is a benzyl radical, a cyclohexyl radical, a phenyl radical, a pyridyl radical, a quinolyl radical, a pyrimidinyl radical; or an azolyl radical having the formula

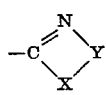

wherein X is an oxygen or sulfur atom or when Y is a two-atom chain of carbon atoms X also can be a nitrogen atom; and Y is an ethylenically-unsaturated, two-atom chain of carbon atoms or a nitrogen and a carbon atom.

The azo compounds of the invention produce bright yellow to turquoise shades when applied to polyester fibers, yarns and fabrics according to conventional procedures. The novel compounds possess improved properties such as dyeability and fastness, e.g., fastness to light, resistance to sublimation, etc. The description of the novel azo compounds as "water-insoluble" means that the azo compounds are relatively and substantially water-insoluble because the compounds are free of water-solubilizing groups such as sulfo and salts thereof.

The diazo component represented by R can be unsubstituted or, preferably, substituted with, for example, lower alkyl, lower alkoxy, aryl, nitro, halogen, lower alkylthio, lower alkoxycarbonylalkylthio, cyclohexylthio, arylthio, lower aralkylthio, formyl, lower alkanoyl, lower alkoxycarbonyl, aroyl, lower alkanoylamino, aroylamino, cyano, lower alkylsulfonyl, arylsulfonyl, lower alkylsulfonamido, trifluoromethyl, sulfamoyl, lower alkylsulfamoyl, carbamoyl, lower alkylcarbamoyl, thiocyanato, etc. The alkanoyl groups can be substituted with substituents such as halogen, phenyl, cyano, lower alkoxy, lower alkylthio, lower alkylsulfonyl, etc. The alkylsulfonyl groups can also be substituted, for example, with cyano, hydroxy, halogen and the like. The alkoxycarbonyl groups can be substituted, for example, with hydroxy or cyano. As used herein to describe a group containing an alkyl moiety, "lower" designates a carbon content from 1 to about 4 carbon atoms. Examples of the alkyl and alkoxy groups which can be present on the diazo components include methyl, ethyl, isopropyl, propyl, butyl, methoxy, ethoxy, propoxy, butoxy, etc. Chlorine and bromine are typical halogen atoms. Methylsulfonyl, ethylsulfonyl, propylsulfonyl, butylsulfonyl, 2-cyanoethylsulfonyl, 2-hydroxyethylsulfonyl, acetyl, propionyl, butyryl, isobutyryl, 3-chloropropionyl, cyanoacetyl, methoxycarbonyl, ethoxycarbonyl, propoxycarbonyl, 2-cyanoethoxycarbonyl, 2-hydroxyethoxycarbonyl, etc., are examples of the alkylsulfonyl, alkanoyl, and alkoxycarbonyl groups which can be present on the groups represented by R.

Acetamido, propionamido, methylsulfonamido, ethylsulfonamido and butylsulfonamido are typical alkanoylamino and alkylsulfonamido substituents which can be present on the diazo component. Dimethylsulfamoyl, ethylsulfamoyl, butylsulfamoyl, diethylcarbamoyl, propylcarbamoyl, dibutylcarbamoyl are examples of the alkylsulfamoyl and alkylcarbamoyl groups. The aryl groups which can be present on the diazo component including the aryl moiety of the arylthio, aralkylthio, aroyl and arylsulfonyl groups are preferably monocyclic, carbocyclic aryl such as phenyl and phenyl substituted, for example, with lower alkyl, e.g., tolyl; lower alkoxy, e.g., anisyl; halogen, e.g., chlorophenyl, bromophenyl; etc. Benzoyl, p-toloyl, p-chlorobenzoyl, p-nitrobenzoyl, p-ethoxyphenylthio, p-chlorobenzylthio, benzamido, p-tolylamino, p-tolylsulfonyl, p-ethoxyphenylsulfonyl, etc., are examples of the aryl-containing groups which can be present on the groups represented by R.

Illustrative of the phenyl radicals which R can represent are 2-chloro-4-nitrophenyl, 4-nitrophenyl, 2-chloro-4-methylsulfonylphenyl, 2,4 - di(methylsulfonyl)phenyl, 2-methylsulfonyl - 4 - nitrophenyl, 2 - nitro - 4 - methylsulfonylphenyl, 2 - acetyl - 4 - nitrophenyl, 2-ethoxycarbonyl-4-nitrophenyl, 2,6-dicyano - 4 - nitrophenyl, 4 - methoxycarbonylphenyl, 2-trifluoromethyl - 4 - nitrophenyl, 2,4-dicyanophenyl, 2 - bromo - 6 - cyano - 4 - nitrophenyl, 4-nitro-2-sulfamoylphenyl, 2 - nitro - 4 - (dimethyl)sulfamoylphenyl, 4-cyanophenyl, 4 - methylsulfonylphenyl, 4-trifluoromethylphenyl, 4 - chlorophenyl, 4 - ethylsulfamoylphenyl, 4-acetylphenyl, 4 - ethylcarbamoylphenyl, 2-carbamoyl-4-nitrophenyl, 2 - methylsulfonyl - 4 - thiocyanophenyl, 2,6-dichloro-4-nitrophenyl, 2-nitro - 4 - thiocyanatophenyl, 2-chloro-6-cyano-4-nitrophenyl, 2 - cyano-4-nitrophenyl, 2-chloro - 4 - cyanophenyl, 2 - chloro - 4-ethoxycarbonylphenyl. Examples of the phenylazophenyl radicals represented by R are 4-phenylazophenyl, 4-(4'-methylphenylazo)phenyl, 4 - (2',5' - dimethylphenylazo)-3-methylphenyl, 4-(4'-acetamidophenylazo) - 2,5 - dimethoxyphenyl, 4-(3' - benzamidophenylazo) - 3 - chlorophenyl, etc. Preferably, the phenyl diazo component of the monoazo compounds contains not more than three substituents at the para and ortho positions.

A preferred group of the diazo components represented by R have the formula

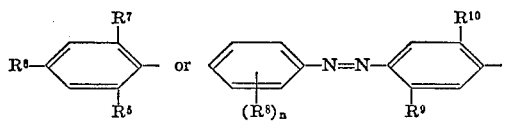

wherein

R⁵ is hydrogen, halogen, cyano, formyl, lower alkanoyl, benzoyl, lower alkoxycarbonyl, lower alkylsulfonyl, sulfamoyl, lower alkylsulfamoyl, carbamoyl, lower alkylcarbamoyl, or trifluoromethyl;

R⁶ is halogen, cyano, lower alkylsulfonyl, formyl, lower alkanoyl, benzoyl, lower alkoxycarbonyl, sulfamoyl, lower alkylsulfamoyl, carbamoyl, lower alkylcarbamoyl, trifluoromethyl, or nitro;

R⁷ is hydrogen, halogen, cyano or nitro; and

R⁸, R⁹ and R¹⁰ are the same or different and each is hydrogen, lower alkyl, lower alkoxy or halogen and $n$ is 1 or 2.

The acyl groups represented by A can be formyl, lower alkanoyl, aroyl, cyclohexylcarbonyl, lower alkoxycarbonyl, aryloxycarbonyl, lower alkylsulfonyl, arylsulfonyl, carbamoyl, lower alkylcarbamoyl, arylcarbamoyl, furoyl, etc. The alkanoyl, alkoxycarbonyl and alkylsulfonyl groups can be substituted as described above in the definition of R. Acetyl, propionyl, butyryl, cyanoacetyl, chloroacetyl, phenylacetyl, methoxyacetyl, methylthioacetyl, methylsulfonylacetyl, methoxycarbonyl, propoxycarbonyl, butoxycarbonyl, methylsulfonyl, ethylsulfonyl, propylsulfonyl, butylsulfonyl, 2-cyanoethylsulfonyl, 2-methoxyethylsulfonyl and 2-chloroethylsulfonyl are examples of the alkanoyl, alkoxycarbonyl and alkylsulfonyl groups which A can represent. The aryl group of the aroyl, aryloxycarbonyl, arylsulfonyl and acrylcarbamoyl group is preferably monocyclic, carbocyclic aryl such as unsubstituted phenyl and phenyl substituted with, for example, lower alkyl, lower alkoxy, halogen, etc. Tolyl, anisyl, p-bromophenyl and o,p-dichlorophenyl are typical of such aryl groups. Dimethylcarbamoyl, ethylcarbamoyl, propylcarbamoyl and butylcarbamoyl are illustrative alkylcarbamoyl groups which A can represent.

Examples of the groups which R¹ can represent are described in the preceding examples of the substituents which can be present on the diazo components represented by R.

The alkyl radicals represented by R² can be unsubstituted or substituted, straight- or branch-chain lower alkyl. Representative examples of such alkyl radicals include methyl, ethyl, propyl, isopropyl, butyl, isobutyl, etc., and lower alkyl substituted, for example with hydroxy, e.g., 2-hydroxyethyl, 2,3-dihydroxypropyl; lower alkoxy, e.g., 2-methoxyethyl; cyano, e.g., 2-cyanoethyl; lower cyanoalkoxyalkyl, e.g., 2-cyanoethoxyethyl; lower alkanoyloxy, e.g., acetoxyethyl; lower alkoxycarbonyl, e.g., 2-ethoxycarbonylethyl; halogen, e.g., 2-chloroethyl, 3-chloropropyl, 2-bromoethyl, 3-chloro-2-hydroxypropyl; lower alkanoylamino, e.g., 2-acetamidoethyl, 3-propionamidopropyl; carbamoyl, e.g., 2-carbamoylethyl; lower alkylcarbamoyl, e.g., ethylcarbamoylethyl, 3-dimethylcarbamoylpropyl; phenylcarbamoyloxy, e.g., 2-phenylcarbamoyloxyethyl; lower alkylsulfonyl, e.g., 2-methylsulfonylethyl, lower alkoxycarbonyloxy, e.g., $CH_3OCOOCH_2CH_2-$; dicarboximido, e.g., 3-phthalimidopropyl, 3-glutarimidopropyl; 2-succinimidoethyl; phenoxy, e.g., 2-phenoxyethyl; lower alkylsulfonamido, e.g., 2-methylsulfonamidoethyl; pyrrolidinono, e.g., 2-(2-pyrrolidinono)ethyl; piperidono, e.g., 3-(2-piperidono)propyl; phthalimidino, e.g., 2-phthalimidinoethyl, etc. The phenyl radicals represented by R² can be unsubstituted or substituted, for example, with lower alkyl, lower alkoxy, hydroxy, halogen, nitro, etc. p-Chlorophenyl, m-bromophenyl, m-nitrophenyl, p-tolyl, p-anisyl, o,p-dichlorophenyl, and p-butoxyphenyl are examples of such substituted phenyl radicals. Cyclohexyl and lower alkylcyclohexyl are typical cyclohexyl radicals that R² can represent. The aryl moiety of the aralkyl groups which R² can represent preferably is monocyclic aryl such as phenyl and phenyl substituted, for example, with lower alkyl, lower alkoxy, halogen, hydroxy, lower alkoxycarbonyl, cyano, etc. Benzyl, phenylethyl, p-ethylbenzyl, p-methoxybenzyl, m-bromobenzyl, o,p-dichlorobenzyl, p-methoxycarbonylbenzyl, p-hydroxybenzyl and m-cyanobenzyl are typical aralkyl groups represented by R².

The alkylene radicals represented by R³ can be straight- or branch-chain, unsubstituted or substituted alkylene containing up to about 4 carbon atoms. Chlorine, bromine, lower alkoxy and lower alkanoyloxy are typical substituents which can be present on the alkylene chain. Examples of the alkylene radicals represented by R³ include ethylene, propylene, isopropylene, butylene, isobutylene, 2-chloropropylene, 2-hydroxypropylene, 2-ethoxypropylene, 2-acetoxypropylene, etc.

Examples of the phenyl, benzyl and cyclohexyl radicals which R⁴ can represent are set forth above in the definition of R². The pyridyl, quinolyl and pyrimidinyl radicals can be unsubstituted or substituted with lower alkyl. 2-Pyridyl, 3-pyridyl, 4-pyridyl, 4-methyl-2-pyridyl, 2-quinolyl, 7-ethyl-2-quinolyl, 4-quinolyl, 2-pyrimidinyl and 4,6-dimethyl-2-pyrimidinyl are typical pyridyl, quinolyl and pyrimidinyl radicals which R⁴ can represent. Examples of the azolyl radicals represented by R⁴ and the chain atoms represented by —X—Y— include a thiazolyl radical (—X—Y— is —S—C=C—), an isothiazolyl radical (—X—Y— is —C=C—S), an oxazolyl radical (—X—Y— is —O—C=C—), an isoxazolyl radical (—X—Y— is —C=C—O—), an imidazolyl radical (—X—Y— is —N—C=C—), a thiadiazolyl radical (—X—Y— is —S—C=N— or —S—N=C—)

and an oxadiazolyl radical (—X—Y— is —O—C=N—). The azolyl radicals set forth also can be part of a bicyclic azolyl group such as in a benzothiazolyl, benzoxazolyl, or benzimidazolyl radical. The carbon atoms of the azolyl groups represented by R⁴ and the secondary nitrogen atoms present in certain of the atom chains represented by —X—Y— can be unsubstituted or substituted. The substituents which can be present on the diazo groups represented by R and the substituents represented by R² are examples of the substituents which also can be present on the azolyl radicals represented by R⁴. 1,3,4-oxazol-2-yl, 5 - phenyl-1,3,4-oxazol-2-yl, 5-acetamido-1,3,4-thiadiazol-2-yl, 6-methyl-2-benzothiazolyl, 4,6-dichloro-2-benzothiazolyl, 6 - cyano-2-benzoxazolyl, 6-methylsulfonyl-2-benzothiazolyl, 5-methoxy-2-benzoxazolyl, 6-nitro-2-benzothiazolyl, 2-benzimidazolyl, 6-thiocyano-2-benzothiazolyl, 2-thiazolyl, and 4,6-di-bromo-2-benzothiazolyl are typical azolyl groups which R⁴ can represent.

Preferred groups represented by R⁴ have the formula

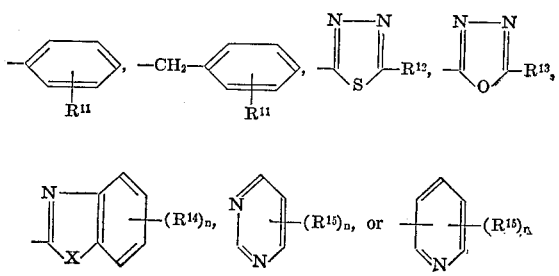

wherein

R¹¹ is hydrogen, lower alkyl, lower alkoxy, or halogen;
R¹² is hydrogen, amino, lower alkanoylamino or lower alkylsulfonamido;
R¹³ is hydrogen, lower alkyl, phenyl or phenyl substituted with lower alkyl, lower alkoxy or halogen;
R¹⁴ is hydrogen, lower alkyl, lower alkoxy, halogen, nitro, lower alkylsulfonyl, cyano or thiocyanato;
R¹⁵ is hydrogen or lower alkyl;
X is —O—, —S— or —NH—; and
n is 1 or 2.

Dyeings having particularly good fastness to light and sublimation are obtained on polyester textile materials by the application thereto of a compound having formula (I) wherein R is a group having the formula

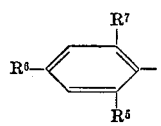

wherein

R⁵ is hydrogen, chlorine, bromine, cyano, lower alkanoyl, lower alkoxycarbonyl, lower alkylsulfonyl or trifluoromethyl;
R⁶ is nitro, lower alkylsulfonyl or thiocyanato;
R⁷ is hydrogen, cyano or nitro;
A is lower alkanoyl;
R¹ is hydrogen;
R² is lower alkyl, lower cyanoalkyl, lower hydroxyalkyl, lower alkoxy-lower-alkyl, lower alkanoyloxy-lower-alkyl; or benzyl;
R³ is ethylene or propylene; and
R⁴ is a group having the formula

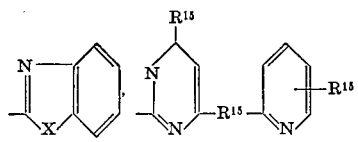

wherein R¹⁵ is hydrogen or methyl; and X is —O—, —S— or —NH—.

The novel compounds of the invention are prepared by diazotizing an amine having the formula R—NH₂ and coupling the diazonium salt with a compound having the formula (II) 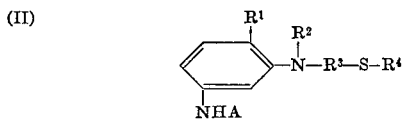

according to known procedures. The couplers are prepared by reacting a thiol having the formula HS—R⁴ with an amine having the formula (III) 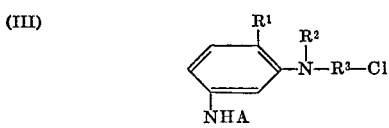

according to known techniques. The thiols having the formula HS—R⁴ are known compounds and/or can be prepared according to published procedures. The amines of formula (III) also can be prepared by known methods. For example, an N-chloroalkylaniline can be nitrated and the resulting nitro group reduced and acylated with a variety of acylating agents.

The following compounds of formula (II) are representative of the couplers useful in preparing the novel azo compounds of the invention:

2-[2-(N-ethyl-m-acetamidoanilino)ethylthio]-benzothiazole: M.P. 84–86° C.
2-[2 - (N-ethyl-m-benzamidoanilino)ethylthio]-benzothiazole: M.P. 122–124° C.

The following examples will further illustrate the preparation of the novel azo compounds of the invention.

EXAMPLE 1

To 5 ml. conc. H₂SO₄ is added 0.72 g. of NaNO₂ with stirring. This solution is cooled and 10 ml. 1:5 acid is added below 10° C. This is stirred and 1.72 g. 2-chloro-4-nitroaniline is added followed by 10 ml. additional 1:5 acid, all at 0–5° C. The diazotization is stirred at 0–5° C. for 3 hrs. and then added to a chilled solution of 3.6 g. 2-[2 - (m-acetamido-n-ethylanilino)ethylthio]benzoxazole dissolved in 100 ml. of 1:5 acid. The coupling is kept cold (below 5° C.) and buffered with ammonium acetate until neutral to Congo red paper. After allowing to couple for 2 hrs., the dye is drowned in water, the product is collected by filtration, washed with water and dried in air. The product, 4-(2-chloro-4-nitrophenylazo)-3-acetamido-N,2-(2 - benzoxazolylthio)ethyl-N-ethylaniline, produces bright red shades on polyester fibers.

EXAMPLE 2 p-Nitroaniline (6.9 g.) is dissolved in 5.4 ml. conc. H₂SO₄ and 12.6 ml. water. This solution is poured on 50 g. of crushed ice, and then a solution of 3.6 g. NaNO₂ in 8 ml. water is added all at once. The diazotization is stirred at 0–5° C. for 1 hr., and then the solution is added to a chilled solution of 2-[2-(m-acetamido-n-ethylaniline)ethylthio]pyrimidine (15.8 g.) dissolved in 250 ml. 1:5 acid. The coupling is kept at 0–5° C. and neutralized with ammonium acetate until it is neutral to Congo red paper. After coupling for 2 hrs., the mixture is drowned in water. The product is collected by filtration, washed with water and air dried. The resulting compound, 4-(4-nitrophenylazo)-3-acetamido-N,2-(2 - pyrimidinylthio)ethyl-N-ethylaniline, gives bright, fast, red dyeings on polyester fibers.

EXAMPLE 3

To 5 ml. of concentrated sulfuric acid is added 0.72 g. of sodium nitrite with stirring. This solution is cooled and 10 ml. of 1:5 acid (1 part propionic acid:5 parts acetic acid) is added below 10° C. This is stirred and 1.72 g. of 2-chloro-4,6-dinitroaniline is followed by 10 ml. additional 1:5 acid, all at 0–5° C. The diazotization is stirred at 0–5° C. for 3 hrs. and then added to a chilled solution of 3.94 g. of 2-[3-(2-ethoxy-5-methylsulfonamido - N - methylanilino)propylthio]benzimidazole dissolved in a mixture of 60 ml. 1:5 acid and 40 ml. 10% hydrochloric acid. The coupling is kept cold (0–5° C.) and buffered with solid ammonium acetate until neutral to Congo red paper. After allowing to couple for 2 hrs., the product is drowned in water, collected by filtration, washed with water and dried in air. The azo compound obtained, 4 - (2-chloro-4,6-dinitrophenylazo)-2-ethoxy-5-methylsulfonamido-N,3 - (2 - benzimidazolylthio)propylaniline, produces navy blue shades on polyester fibers.

The azo compounds disclosed in the examples of the folowling Table are prepared by the procedures described hereinabove and conform to formula (I). The color given in each example refers to dyeings of the azo compound on polyester fibers.

TABLE

| Ex. No. | R | A | R¹ | R² | R³ | R⁴ | Color |
|---|---|---|---|---|---|---|---|
| 4 | 4-CH₃SO₂-phenyl | —COC₆H₅ | H | —C₂H₅ | —CH₂CH₂— | 2-pyrimidinyl | Yellow. |
| 5 | do | —COCH₃ | H | —CH₂CH₂OH | —CH₂CH₂— | do | Do. |
| 6 | 2,4-di-CH₃SO₂-phenyl | —COCH₃ | H | —C₂H₅ | —CH₂CH₂— | do | Red. |
| 7 | 4-Cl-phenyl | —SO₂C₆H₄-p-CH₃ | H | —CH₂CH(CH₃)₂ | —(CH₂)₄— | do | Yellow. |
| 8 | 4-NO₂-phenyl | —COC₆H₅ | H | —C₂H₅ | —CH₂CH₂— | do | Scarlet. |
| 9 | 2-CN-4,6-di-NO₂-phenyl | —COCH₃ | H | —C₂H₅ | —CH₂CH₂— | 2-pyridyl | Blue. |
| 10 | 4-CH₃SO₂-phenyl | —COCH₃ | H | —R³—S—R⁴ | —CH₂CH₂— | 2-pyrimidinyl | Yellow. |
| 11 | 4-Cl-phenyl | —CONHC₂H₅ | H | —C₆H₁₁ | —CH₂CH(OH)CH₂— | 6-OCH₃-2-benzimidazolyl | Do. |
| 12 | 4-NO₂-phenyl | —COC₂H₅ | H | —CH₂C₆H₅ | —(CH₂)₃— | 1,3,4-oxadiazol-2-yl | Scarlet. |
| 13 | 4-CH₃OOC-phenyl | —COCH₂C₆H₅ | H | —CH₂CH₂N(COCH₃)₂ | —CH₂CH₂— | 4-pyridyl | Orange. |
| 14 | 4-Cl-phenyl | —SO₂CH₂CH₂CN | H | —CH₃ | —CH₂CH₂— | 4,6-dimethyl-2-pyrimidinyl | Yellow. |
| 15 | 2,4-di-CH₃SO₂-phenyl | —COCH₃ | H | —C₂H₅ | —CH₂CH₂— | do | Red. |
| 16 | 2,4-di-Cl-4-NO₂-phenyl | —COCH₃ | H | —C₂H₅ | —CH₂CH₂— | do | Red. |
| 17 | 2-Cl-4-NO₂-phenyl | —COCH₃ | H | —C₂H₅ | —CH₂CH₂— | 2-pyridyl | Red. |
| 18 | do | —COCH₃ | H | —C₂H₅ | —CH₂CH₂— | 2-pyrimidinyl | Red. |
| 19 | 2-Br-4-NO₂-phenyl | —COOC₂H₅ | H | —C₂H₅ | —(CH₂)₃— | do | Red. |
| 20 | 2-Cl-4-NO₂-phenyl | —COC₆H₅ | H | —C₂H₅ | —CH₂CH₂— | 2-pyridyl | Red. |
| 21 | 2-Br-4-NO₂-phenyl | —COCH₃ | H | —C₂H₅ | —CH₂CH₂— | 5-phenyl-1,3,4-oxadiazol-2-yl | Red. |
| 22 | 2-Cl-4-NO₂-phenyl | —COCH₃ | H | —C₂H₅ | —CH₂CH₂— | 2-benzothiazolyl | Red. |
| 23 | do | —COC₆H₅ | H | —C₂H₅ | —CH₂CH₂— | do | Red. |
| 24 | 2-CN-4,6-di-NO₂-phenyl | —COC₆H₄-p-OCH₃ | —CH₃ | H | —CH₂CH₂— | 2-pyrimidinyl | Blue. |
| 25 | 2-Cl-4-CH₃SO₂-phenyl | —COCH₃ | H | —CH₂CH₂CN | —CH₂CH₂— | do | Orange. |
| 26 | do | —SO₂C₆H₅ | —Cl | —(CH₂)₃NSO₂CH₃ | —CH₂CHCH₂—<br>OOCCH₃ | do | Do. |
| 27 | 2-Br-4-CH₃SO₂-phenyl | —COCH₃ | H | —CH(CH₃)₂ | —CH₂CH₂— | 4,6-di-CH₃-2-pyridinyl | Do. |
| 28 | 2-Cl-4-CH₃SO₂-phenyl | —COCH₃ | H | —C₂H₅ | —CH₂CH₂— | 6-CN-2-benzimidazolyl | Do. |
| 29 | 2-Cl-4-CN-phenyl | —COCH₃ | H | —C₂H₅ | —CH₂CH₂— | 2-CH₃-4-pyridyl | Red. |
| 30 | 4-CF₃-phenyl | —COCH₃ | H | —C₂H₅ | —CH₂CH₂— | 2-pyridyl | Red. |
| 31 | 2-COOCH₃-4-NO₂-phenyl | —COCH₃ | H | —C₂H₄NCO-o-C₆H₄-CO | —CH₂CH₂— | 5-ethyl-2-pyridyl | Orange. |
| 32 | 2,6-di-CN-4-NO₂-phenyl | —COC₆H₅ | H | —C₂H₅ | —CH₂CH₂— | 2-benzothiazolyl | Blue. |
| 33 | 2-Cl-6-CN-4-NO₂-phenyl | —COCH₃ | H | —C₂H₅ | —CH₂CH₂— | do | Do. |
| 34 | 2-CN-4,6-di-NO₂-phenyl | —COCH₂OH | H | —C₂H₅ | —CH₂CH₂— | do | Do. |
| 35 | do | —SO₂CH₃ | H | —C₂H₅ | —CH₂CH₂— | do | Do. |
| 36 | do | —COCH₃ | H | —C₂H₅ | —CH₂CH₂— | Phenyl | Do. |
| 37 | do | —COC₆H₅ | H | —C₂H₅ | —CH₂CH₂— | —C₆H₄-p-CH₃ | Do. |
| 38 | do | —CONHC₆H₅ | H | —C₂H₅ | —CH₂CH₂— | —C₆H₄-p-Cl | Do. |
| 39 | do | —COCH₃ | H | —C₂H₅ | —CH₂CH₂— | —C₆H₄-p-Cl | Do. |
| 40 | do | —COCH₃ | H | —C₂H₅ | —CH₂CH₂— | —C₆H₄-p-C(CH₃)₃ | Do. |
| 41 | do | —COCH₃ | H | —C₂H₅ | —CH₂CH₂— | 2-pyridyl | Do. |
| 42 | do | —COCH₃ | H | —C₂H₅ | —CH₂CH₂— | 2-pyrimidinyl | Do. |
| 43 | do | —COCH₃ | H | —C₂H₅ | —CH(CH₃(OH)CH₂— | 2-benzimidiazolyl | Do. |
| 44 | do | —COCH₃ | H | —C₂H₅ | —CH₂CH₂— | 2-benzoxazolyl | Do. |
| 45 | do | —COCH₃ | H | —CH₂CH₂OCOOC₂H₅ | —CH₂CH₂— | 2-pyridyl | Do. |
| 46 | 2-Cl-4-NO₂-phenyl | —COCH₃ | H | —C₂H₅ | —CH₂CH₂— | 4-CH₃-2-thiazolyl | Red. |
| 47 | do | —COCH₃ | H | —C₂H₅ | —CH₂CH₂— | 1-phenyl-2-imidazolyl | Red. |
| 48 | do | —COCH₃ | H | —CH₂C₆H₅ | —CH₂CH₂— | 5-phenoxy-1,3,4-thiadiazol-3-yl | Red. |
| 49 | do | —COCH₃ | H | —CH₂C₆H₅ | —CH₂CH₂— | 2-quinolyl | Red. |
| 50 | do | —COCH₃ | H | —C₂H₅ | —C₆H₁₁ | Red. |
| 51 | do | —COCH₃ | H | —C₂H₅ | —CH₂CH₂— | —CH₂C₆H₅ | Red. |

The invention is described herein in detail with particular reference to preferred embodiments thereof, but it will be understood that variations and modifications can be effected within the spirit and scope of the invention.

The compounds of the invention can be applied to polyester by known disperse dyeing techniques employing carriers, surfactants, dispersing agents, etc. Dyeing can be conducted at atmospheric or super-atmospheric pressures. The following example illustrates a carrier dyeing procedure for applying the azo compounds of the invention to dye polyester textile materials.

EXAMPLE 52

An amount of 0.1 g. of the azo compound of Example 1 is dissolved in 10 cc. of 2-methoxyethanol. A small amount (3–5 cc.) of a 3% sodium lignin sulfonate aqueous solution is added, with stirring, and then the volume of the bath is brought to 300 cc. with water. 3 cc. of an anionic solvent carrier (Tanavol) is added to the bath and 10 grams of a textile fabric made of poly(ethylene terephthalate) fibers is placed in the bath and worked 10 minutes without heat. The dyeing is carried out at the boil for one hour. The dyed fabric is removed from the dyebath and scoured for 20 minutes at 80° C. in a solution containing 1 g./l. neutral soap and 1 g./l. sodium carbonate. The fabric is then rinsed, dried in an oven at 250° F. and heat set (for the removal of residual carrier) for 5 minutes at 350° C.

The compounds of the invention can also be applied to polyester textile materials by the heat fixation technique described in U.S. Pat. 2,663,612 and in the American Dyestuff Reporter, 42, 1 (1953). The following procedure describes how the azo compounds of the invention can be applied to polyester materials by the heat fixation technique.

EXAMPLE 53

A mixture of:
500 mg. of the compound of Example 3, 150 mg. of a sodium lignosulfonate dispersing agent (Marasperse N), 150 mg. of a partially desulfonated sodium lignosulfonate (Marasperse CB), 0.5 ml. glycerin, and 1.0 ml. of water is ground in a micro-size container (an accessory for a 1-quart size Szegvari Attritor) for approximately 3.5 hours. Enough ⅛-inch stainless steel balls are added to provide maximum grinding. When the grinding is complete, the entire contents are poured into a beaker and 100 ml. of water are used to wash the remaining dye paste from the micro-container. The dye paste is then heated slowly to 65° C. with continuous stirring. A thickener and penetrating mixture is prepared by mixing 1 ml. of a complex diaryl sulfonate surfactant (compound 8-S), 3 ml. of a 3% solution of a sodium N-methyl-N-oleoyl-taurate (Igepon T-S1), 8 ml. of a 25% solution of natural gums (Superclear 80N, and sufficient water to bring the volume to 100 ml. The thickener and penetrating mixture is added to the dye paste, the volume is adjusted to 200 ml. and the mixture is agitated for 15 minutes. The dye mixture is then filtered through folded cheesecloth to remove the stainless steel balls and it then is added to the reservoir of a Butterworth padder where it is heated to about 45–60° C.

Ten g. of a fabric of poly(ethylene terephthalate) fibers and 10 g. of a fabric of 65/35 spun poly(ethylene terephthalate)/cotton fibers are sewn together, end-to-end, and padded for 5 minutes of continuous cycling through the dye mixture and between three rubber squeeze rollers of the padder. Dye mixture pick-up is about 60% based on the weight of the fabrics. The padded fabrics are then dried at 200° F. and then heat-fixed for 2 minutes at 415° F. in a forced air oven. The dyed fabrics are scoured for 20 minutes at 65–70° C. in a solution containing 0.2% sodium hydrosulfite, 0.2% sodium carbonate and 1.7% of a 3% solution of sodium N-methyl-N-oleoyltaurate and then dried. The dyed fabrics possess excellent brightness and exhibit outstanding fastness to light and sublimation when tested according to the procedures described in the 1966 edition of the Technical Manual of the American Association of Textile Chemists and Colorists.

The heat fixation dyeing procedure described above can be varied by the substitution of other dispersing agents, surfactants, suspending agents, thickeners, etc. The temperature and time of the heat-fixation step can also be varied.

Polymeric linear polyester materials of the terephthalate sold under the trademarks "Kodel," "Dacron" and "Terylene" are illustrative of the linear aromatic polyester textile materials that can be dyed with the compounds of our invention. Examples of linear polyester textile materials that can be dyed with the compounds of the invention are those prepared from ethylene glycol and dimethylterephthalate or from cyclohexanedimethanol and dimethylterephthalate. Polyesters prepared from cyclohexanedimethanol and dimethylterephthalate are more particularly described in U.S. Pat. 2,901,446. Poly(ethylene terephthalate) polyester fibers are described, for example in U.S. Pat. 2,465,319. The polymeric linear polyester materials disclosed in U.S. Pats. 2,945,010, 2,957,745 and 2,989,363, for example, can be dyed. The linear aromatic polyester materials specifically named have a melting point of at least 200° C. The poly(ethylene terephthalate) fibers which are dyed with the compounds of the invention are manufactured from a melt of a polymer having an inherent viscosity of at least 0.35 and preferably, about 0.6. The inherent viscosity of the poly(1,4-cyclohexylenedimethylene terephthalate) polymer is also at least 0.35. These inherent viscosities are measured at 25° C. using 0.25 g. polymer per 100 ml. of a solvent consisting of 60% phenol and 40% tetrachloroethane. The polyester fabrics, yarns, fibers and filaments that are dyed with the novel azo compounds can also contain minor amounts of other additives such as brighteners, pigments, delusterants, inhibitors, stabilizers, etc. Although the novel compounds of the invention are particularly useful as dyes for polyester textile materials, the novel compounds also can be used to dye other hydrophobic textile materials such as cellulose acetate, polyamide and modacrylic fibers.

The invention has been described in considerable detail with particular reference to certain preferred embodiments thereof, but it will be understood that variations and modifications can be effected within the spirit and scope of the invention.

We claim:
1. An azo compound having the formula

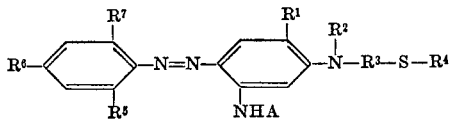

wherein

A is acylamido selected from formyl; lower alkanoyl; lower alkanoyl substituted with halogen, cyano, lower alkoxy, hydroxy, lower alkylsulfonyl, or phenyl; benzoyl; benzoyl substituted with lower alkyl, lower alkoxy or halogen; cyclohexylcarbonyl; lower alkoxycarbonyl; lower alkoxycarbonyl substituted with hydroxy or cyano; phenoxycarbonyl; phenoxycarbonyl substituted with lower alkyl, lower alkoxy or halogen; lower alkylsulfonyl; lower alkylsulfonyl substituted with cyano, hydroxy or halogen; phenylsulfonyl; phenylsulfonyl substituted with lower alkyl, lower alkoxy, or halogen; carbamoyl; lower alkylcarbamoyl; di-lower alkylcarbamoyl; phenylcarbamoyl; phenylcarbamoyl substituted with lower alkyl, lower alkoxy or halogen; or furoyl;

$R^1$ is hydrogen, lower alkyl, lower alkoxy or halogen;

$R^2$ is hydrogen; lower alkyl; lower alkyl substituted with hydroxy, lower alkoxy, cyano, lower cyanoalkoxy, lower alkanoyloxy, lower alkoxycarbonyl, halogen, lower alkanoylamino, carbamoyl, lower alkylcarbamoyl, phenylcarbamoyloxy, lower alkylsulfonyl, lower alkoxycarbonyloxy, lower alkylsulfonamido, phthalimido, glutaramido, succinimido, phenoxy, pyrrolidinono, piperidino or phthalimidino; cyclohexyl; lower alkylcyclohexyl; phenyl; phenyl substituted with lower alkyl, lower alkoxy, hydroxy, halogen or nitro; aralkyl in which the alkyl moiety contains 1 to 2 carbon atoms and the aryl moiety is phenyl or phenyl substituted with lower alkyl, lower alkoxy, halogen, hydroxy, cyano or lower alkoxycarbonyl; or the group —$R^3$—S—$R^4$;

$R^3$ is lower alkylene or lower alkylene substituted with hydroxy, lower alkoxy, halogen or lower alkanoyloxy; and $R^4$ is a group having the formula:

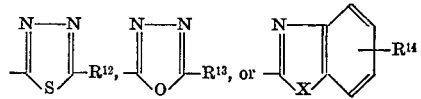

wherein $R^{12}$ is hydrogen, amino, lower alkanoylamino or lower alkylsulfonamido;

$R^{13}$ is hydrogen, lower alkyl, phenyl or phenyl substituted with lower alkyl, lower alkoxy or halogen;

$R^{14}$ is hydrogen, lower alkyl, lower alkoxy, halogen, nitro, lower alkylsulfonyl, cyano or thiocyanato;

X is —O—, —S—, or —NH—;

$R^5$ is hydrogen, chlorine, bromine, cyano or nitro;

$R^6$ is nitro, lower alkylsulfonyl, cyano, chlorine, bromine, sulfamoyl, or phenylazo; and $R^7$ is hydrogen, chlorine, bromine, nitro, formyl, lower alkanoyl, lower alkoxycarbonyl, trifluoromethyl, lower alkylsulfonyl, cyano, sulfamoyl or carbamoyl.

2. A compound according to Claim 1 wherein
$R^5$ is hydrogen, halogen, cyano or nitro;
$R^6$ is nitro, lower alkylsulfonyl, thiocyanato or sulfamoyl; and
$R^7$ is hydrogen, halogen, formyl, lower alkanoyl, lower alkoxycarbonyl trifluoromethyl, lower alkylsulfonyl, cyano, sulfamoyl or carbamoyl.

3. A compound according to Claim 2 wherein $R^4$ is a group having the formula

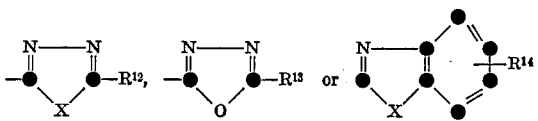

wherein $R^{12}$ is hydrogen, amino, lower alkanoylamino or lower alkylsulfonamido;

$R^{13}$ is hydrogen, lower alkyl, phenyl or phenyl substituted with lower alkyl, lower alkoxy or halogen, $R^{14}$ is hydrogen, lower alkyl, lower alkoxy, halogen, nitro, lower alkylsulfonyl, cyano or thiocyanato; and X is —O—, —S—, or —NH—.

4. A compound according to Claim 1 having the formula

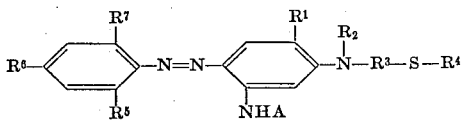

wherein $R^5$ is hydrogen, chlorine, bromine, cyano, lower alkanoyl, lower alkoxycarbonyl, lower alkylsulfonyl or trifluoromethyl;

$R^6$ is nitro, lower alkylsulfonyl or thiocyanato;

$R^7$ is hydrogen, cyano or nitro;

A is lower alkanoyl;

$R^1$ is hydrogen;

$R^2$ is lower alkyl, lower cyanoalkyl, lower hydroxyalkyl, lower alkoxy-lower-alkyl, lower alkanoyloxy-lower-alkyl, or benzyl;

$R^3$ is ethylene or propylene; and $R^4$ is a group having the formula

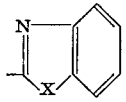

wherein X is —O—, —S— or —NH—.

5. A compound according to Claim 4 wherein $R^5$ is hydrogen, chlorine or bromine;

$R^6$ is nitro;

$R^7$ is hydrogen;

A is acetyl;

$R^1$ is hydrogen;

$R^2$ is ethyl; and $R^3$ is ethylene.

6. A compound according to Claim 4 wherein $R^5$ is hydrogen, chlorine, bromine or methylsulfonyl;

$R^6$ is methylsulfonyl;

$R^7$ is hydrogen;

A is acetyl;

$R^1$ is hydrogen;

$R^2$ is ethyl; and $R^3$ is ethylene.

7. A compound according to Claim 4 wherein $R^5$ and $R^6$ each is nitro;

$R^7$ is cyano;

A is acetyl;

$R^1$ is hydrogen;

$R^2$ is ethyl; and $R^3$ is ethylene.

8. A compound according to Claim 4 wherein $R^5$ and $R^6$ each is nitro;

$R^7$ is chlorine, bromine or cyano;

A is acetyl;

$R^1$ is methoxy or ethoxy;

$R^2$ is ethyl; and $R^3$ is ethylene.

References Cited
UNITED STATES PATENTS

| | | | |
|---|---|---|---|
| 2,373,700 | 4/1945 | McNally et al. | 260—207.1 X |
| 3,099,652 | 7/1963 | Straley et al. | 260—147 |
| 3,246,004 | 4/1966 | Hall et al. | 260—303 |
| 3,445,454 | 5/1969 | Fishwick et al. | 260—205 |
| 3,478,011 | 11/1969 | Artz | 260—205 |
| 3,177,198 | 4/1965 | Weis et al. | 260—152 |
| 3,515,714 | 6/1970 | Dale et al. | 260—158 |
| 3,595,852 | 7/1971 | Hahn et al. | 260—158 |

FLOYD DALE HIGEL, Primary Examiner

U.S. Cl. X.R.

8—41 C; 260—152, 154, 155, 156, 158, 207, 207.1, 306.8 F

UNITED STATES PATENT OFFICE
CERTIFICATE OF CORRECTION

Patent No. 3,840,517         Dated October 8, 1974

Inventor(s) Max A. Weaver, Clarence A. Coates, Jr.

It is certified that error appears in the above-identified patent and that said Letters Patent are hereby corrected as shown below:

Column 10, Claim 3, lines 66-69, delete the first formula

and insert

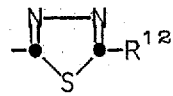

Signed and sealed this 4th day of March 1975.

(SEAL)
Attest:

RUTH C. MASON
Attesting Officer

C. MARSHALL DANN
Commissioner of Patents
and Trademarks